UNITED STATES PATENT OFFICE.

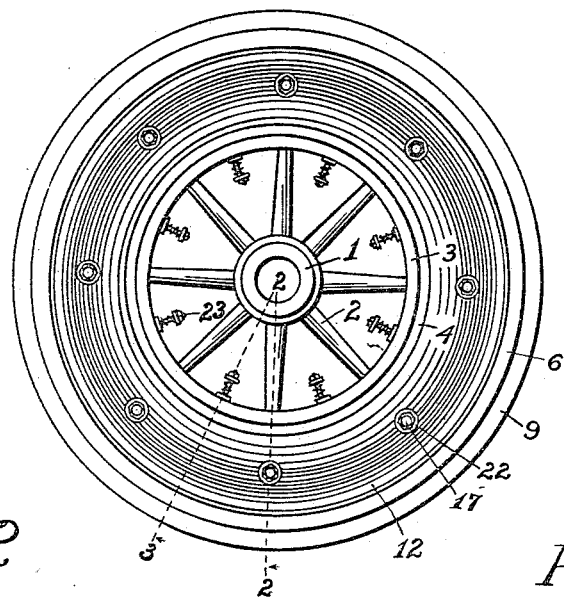
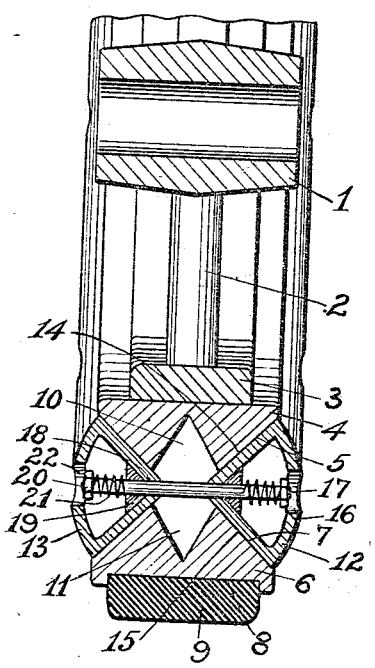
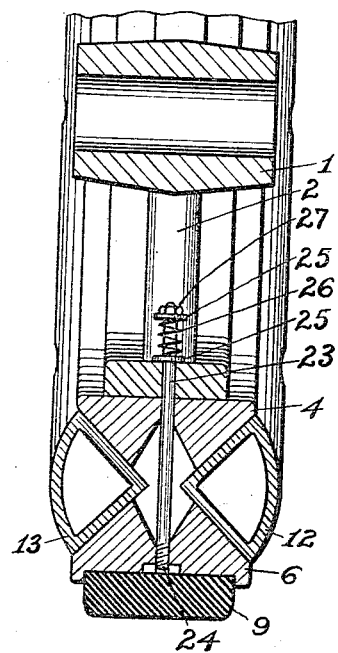

MICHAEL NAYLON, OF CLEVELAND, OHIO.

RESILIENT WHEEL.

1,267,788.      Specification of Letters Patent.      Patented May 28, 1918.

Application filed January 26, 1918. Serial No. 213,889.

*To all whom it may concern:*

Be it known that I, MICHAEL NAYLON, a citizen of the United States, residing at Cleveland, in the county of Cuyahoga and State of Ohio, have invented certain new and useful Improvements in Resilient Wheels, of which the following is a specification.

This invention relates to resilient wheels for automobiles, aeroplanes, and the like, and has for its principal object to provide a wheel which is resilient in itself thereby obviating the necessity of using pneumatic tires and permitting the use of solid tires.

With the above and other objects in view as will be readily understood, the invention will be hereinafter fully described in connection with the accompanying drawings, which illustrate the same, and the novel features thereof will be distinctly pointed out in the appended claims.

In the drawings like characters of reference designate the corresponding parts.

Figure 1 is a side elevation of a wheel constructed in accordance with my invention, Fig. 2 is a fragmental cross section on an enlarged scale, taken on line 2—2 of Fig. 1, and Fig. 3 is a similar view taken on line 2—3 of Fig. 1.

In the drawings, 1 represents the hub, 2 the spokes, and 3 the felly of a wheel of ordinary construction. Securely fixed to the felly is an annular band 4 having a pair of inclined faces 5. Arranged in spaced relation around said band is a rim 6 of equal width having a pair of similar but oppositely inclined faces 7, and an annular recess 8 for carrying a solid tire 9. Both the band 4 and the rim 6 are grooved or hollowed out at 10 and 11 respectively for the purpose of reducing the weight of the parts. A pair of hollow wedge shaped rings 12 and 13 having converging inclined faces 14 and 15 which correspond to the oppositely inclined faces 5 and 7 are adapted to slidably fit therebetween. The outer walls 16 of the rings 12 and 13 are curved or rounded as shown in cross section to give added strength to the same. Said members are resiliently held in place by means of a plurality of bolts 17, which pass loosely through equally and oppositely spaced openings 18 provided at the juncture of the inclined walls of the rings. Correspondingly tapering washers 19 fit loosely over said bolts between the inclined walls of said rings, and arranged upon the bolts between the washers 19 and nuts 20 at the ends thereof are suitable coiled springs 21. In order to obtain greater or less tension upon said coiled springs, the nuts 20 are adjusted upon the bolts as will be understood, holes 22 being provided in the outer walls 16 for permitting access to the same.

Although the construction described will produce an efficient resilient wheel for general purposes, under some conditions and especially for supporting great weights such as trucks carry, it is advantageous to arrange equally spaced tension rods 23 between the spokes 2 of the wheel. These rods have one of their ends fixed to the rim 6 as at 24, while their other ends pass loosely through the band 4 and the felly 6 for permitting circumferential movement of the rods, thus serving to keep the rim in radial alinement with the band. Pairs of washers 25 are arranged upon the inner projecting ends of said rods, one of which rests against the felly of the wheel, and interposed between the washers around the rods are suitable coiled springs 26. Nuts 27 are threaded on the ends of said rods, which nuts may be adjusted to obtain the proper tension upon the coiled springs and thereby produce a resilient wheel of great strength.

From the foregoing it is obvious that, in action the lower portion of the annular band of the wheel moves toward the rim as the tire carried thereon travels over the ground, and at the same time the upper part of said rim moves away from the annular band. This causes the hollow wedge shaped members 12 and 13 to be forced laterally or outwardly against the action of the coiled springs 21. In the construction employing the tension rods 23, the coiled springs 26, during the radial outward movement of the rim, tend to hold it toward the annular band. As the wheels travel over uneven or rough roads, the annular band moves radially with relation to the rim, and the wedge shaped members move laterally either inwardly or outwardly in a corresponding degree, thereby producing resiliency in the wheels themselves and permitting the use of solid tires.

Having fully described my invention, what I claim is:

1. In a resilient wheel, the combination of an annular band, the band having inclined surfaces, a rim arranged in spaced relation around the band, rings arranged at the sides of the band and the rim, the rings projecting into the space between the band and the rim, the rings having inclined surfaces for coöperating with the inclined surfaces of the band, pins passing loosely through the said rings, nuts at each end of the pins, and coiled springs interposed on the pins between the rings and the nuts for resiliently holding said rings in position, substantially as described.

2. In a resilient wheel, the combination of an annular band, a rim arranged in spaced relation around the band, the rim and the band having oppositely inclined surfaces, hollow wedge shaped rings arranged at the sides of the band and the rim, the rings projecting into the space between the band and the rim and coöperating with the inclined surfaces thereof, and means inclosed by said hollow wedge shaped rings for resiliently drawing said rings together, substantially as described.

3. In a resilient wheel, the combination of an annular band, a rim arranged in spaced relation around the band, the band and the rim having oppositely inclined surfaces, hollow wedge shaped rings arranged at the sides of the band and the rim, the rings projecting into the space between the band and the rim and coöperating with said inclined surfaces thereof, pins passing loosely through said rings and terminating therein, washers on the pins, adjustable nuts at the ends of the pins, and coiled springs interposed on the pins between said washers and said nuts, substantially as described.

4. In a resilient wheel, the combination of an annular band, the band having inclined surfaces, a rim arranged in spaced relation around the band, rings arranged at the sides of the band and the rim, the rings projecting into the space between the band and the rim, the rings having inclined surfaces for coöperating with the inclined surfaces of the band, means for resiliently holding the rings in position, rods having one of their ends fixed to the rim, the other ends of the rods passing loosely through said band, adjustable nuts on the projecting ends of the rods, and coiled springs interposed between the band and the nuts tending to resiliently hold the rim toward the band, substantially as described.

In testimony whereof I affix my signature.

MICHAEL NAYLON.